UNITED STATES PATENT OFFICE.

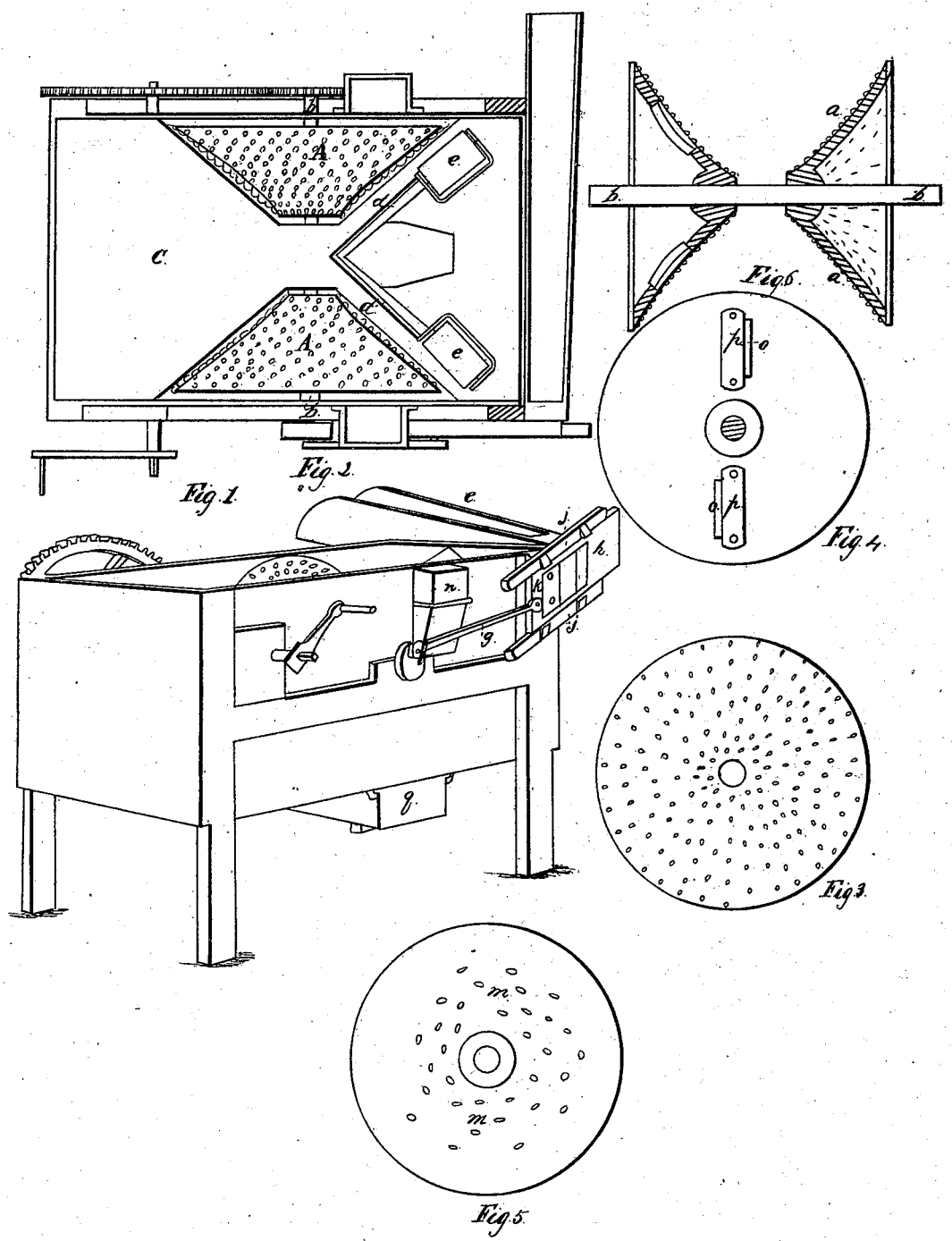

E. PARKER, OF BALTIMORE, MARYLAND.

CORN-SHELLER.

Specification of Letters Patent No. 20,003, dated April 20, 1858.

*To all whom it may concern:*

Be it known that I, ELMON PARKER, of Baltimore, in the State of Maryland, have invented a new and useful Improvement in Machines for Shelling Corn; and I do declare that the following is a full, clear, and exact description of the construction of the same, reference being had to the annexed drawings, making a part of this specification, in which—

Figure 1 is a perspective view, Fig. 2 a top view, Figs. 3 and 6 a view of the shelling wheels.

To enable others to make end use my improvement I will proceed to describe its construction and operation.

I frame two side pieces into four posts (each post being a corner) about half way up the post, the posts being about three feet high. I nail boards across the two ends and sides, making a box about twenty inches wide and thirty inches long. I make the shelling wheels of cast iron (two in number) about twenty inches in diameter, one fourth an inch in thickness, bevel shaped—that is, convex on one side and concave on the other. I bevel them to about six inches at the center. The convex side I make a little concave (Fig. 6, $a, a, a, a,$) from the center to the outer edge to shell tapering ears of corn with more certainty. I hang the two wheels upon a shaft, ($b$, Fig. 6,) the convex sides toward each other about four inches apart (see Fig. 6) and the shaft in boxes upon the two side pieces ($b\ b$, Fig. 1) about midway of the machine. Upon the convex side of the wheels I cast a sufficient number of teeth or ribs (see $a\ a\ a\ a$, Figs. 1 and 6) to rake off the corn effectually. Between the wheels I put a board horizontally, a little inclined toward the end of the machine which discharges the cobs, filling the whole space inside of the machine (Fig. 2, $c$) for the purpose of making a hopper and for the ears to rest upon while shelling. Upon this board I put spring plates or back ($d\ d$) extending from near the center of the wheels about two thirds the distance to the outer edge, (that is to the end of the roller) to press the ears to the wheels while shelling, (see $d\ d$, Fig. 2.) The cob is discharged from within wheel at an opening in the end of the machine and the corn falls under the machine thus separating the corn from the cob. In order to discharge the cob with greater ease in addition to the centrifugal force I place two rollers $e, e$, Fig. 2, one near the outer edge of one wheel and the other in the same position to the other wheel; these rollers are fastened to springs which yield to different sized cobs. The rollers are placed parallel to the face of the wheels and close to the ends of the springs ($d, d,$ Fig. 2) and when the cob is forced along to the roller the cob will turn the roller and be discharged more freely. Under the wheels I fix two apron boards to guide the corn down near the middle of the machine over a box, (which $q$, Fig. 1, shows one end of it.) This box has a screen or sieve over the top of it placed slanting, so fine that the corn will not go through it but slide down over it, the dust falling through it into the box thus cleaning the corn. The ears of corn are fed to the machine near the center of the wheels and will be drawn down either side and discharged from the machine. I run the shelling wheels with any common gearing or with a pulley.

What I claim as my invention and improvement and desire to secure by Letters Patent is—

The combination of the cylinder (A) the spring back ($d$) and rollers ($e$) when they are constructed and arranged with respect to each other as set forth for the purpose specified.

ELMON PARKER.

Witnesses:
EDWD. G. STARO,
L. RIDGELY.